(12) United States Patent
Deng et al.

(10) Patent No.: US 6,208,647 B1
(45) Date of Patent: Mar. 27, 2001

(54) MULTICAST EXTENSION TO DATA LINK LAYER PROTOCOLS

(75) Inventors: Shuang Deng, Nashua, NH (US); Robert Olshansky, Wayland, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/291,794

(22) Filed: Apr. 14, 1999

(51) Int. Cl.[7] ................................................. H04L 12/28
(52) U.S. Cl. ........................ 370/390; 370/230; 370/432; 714/824
(58) Field of Search ................................. 370/230, 231, 370/391, 432; 709/232, 235; 714/819, 824

(56) References Cited

U.S. PATENT DOCUMENTS

| | | | | |
|---|---|---|---|---|
| 4,627,052 | * | 12/1986 | Hoare et al. ........................ | 370/402 |
| 5,058,109 | * | 10/1991 | Goldberg et al. .................. | 370/401 |
| 5,355,371 | * | 10/1994 | Auerbach et al. ................. | 370/255 |
| 5,634,011 | * | 5/1997 | Auerbach et al. ................. | 709/242 |
| 5,796,740 | * | 8/1998 | Perlman et al. ................... | 370/401 |
| 6,006,275 | * | 12/1999 | Picazo, Jr. et al. ................ | 709/249 |
| 6,023,563 | * | 2/2000 | Shani ............................... | 395/200.79 |
| 6,061,350 | * | 5/2000 | Min .................................. | 370/389 |

OTHER PUBLICATIONS

S. Deering, "Host Extension for IP Multicasting", Internet Engineering Task Force, Request for Comments 1112, Aug. 1989.

* cited by examiner

Primary Examiner—Seema S. Rao
Assistant Examiner—Saba Tsegaye
(74) Attorney, Agent, or Firm—Leonard Charles Suchyta (57) ABSTRACT

A data link layer switch includes a switching mechanism coupled to several port interface controllers. The port interface controllers include an address table, an address learner, and an address matcher. The address table stores multicast addresses for hosts attached to the port interface controller. The address learner compares a destination address in an incoming packet to a target address, and stores a multicast address from the incoming packet in the address table when the destination address matches the target address. The address matcher compares a destination address in an outgoing packet to the multicast addresses stored in the address table, and transmits the outgoing packet when the destination address matches one of the multicast addresses.

23 Claims, 9 Drawing Sheets

(PRIOR ART)

MULTICAST EXTENSION TO DATA LINK LAYER PROTOCOLS

RELATED APPLICATION

This application is related to copending U.S. application Ser. No. 09/291,705, which is assigned to the same assignee and filed on the same date as this application, and incorporated by reference.

FIELD OF THE INVENTION

The present invention relates generally to network switches and, more particularly, to a data link layer switch that supports Internet Protocol (IP) multicasting.

BACKGROUND OF THE INVENTION

Multicast communication refers to the transmission of identical data packets to selected, multiple destinations. In contrast, broadcast communication refers to the indiscriminate transmission of data packets to all destinations, and unicast communication refers to the transmission of data packets to a single destination.

Every participant in a multicast receives information transmitted by any other participant in the multicast. Users connected to the network who are not participants in a particular multicast do not receive the information transmitted by the participants of the multicast. In this way, the multicast communication uses only the network components (e.g., switches and trunks) actually needed for the multicast transmission.

Figure 1:
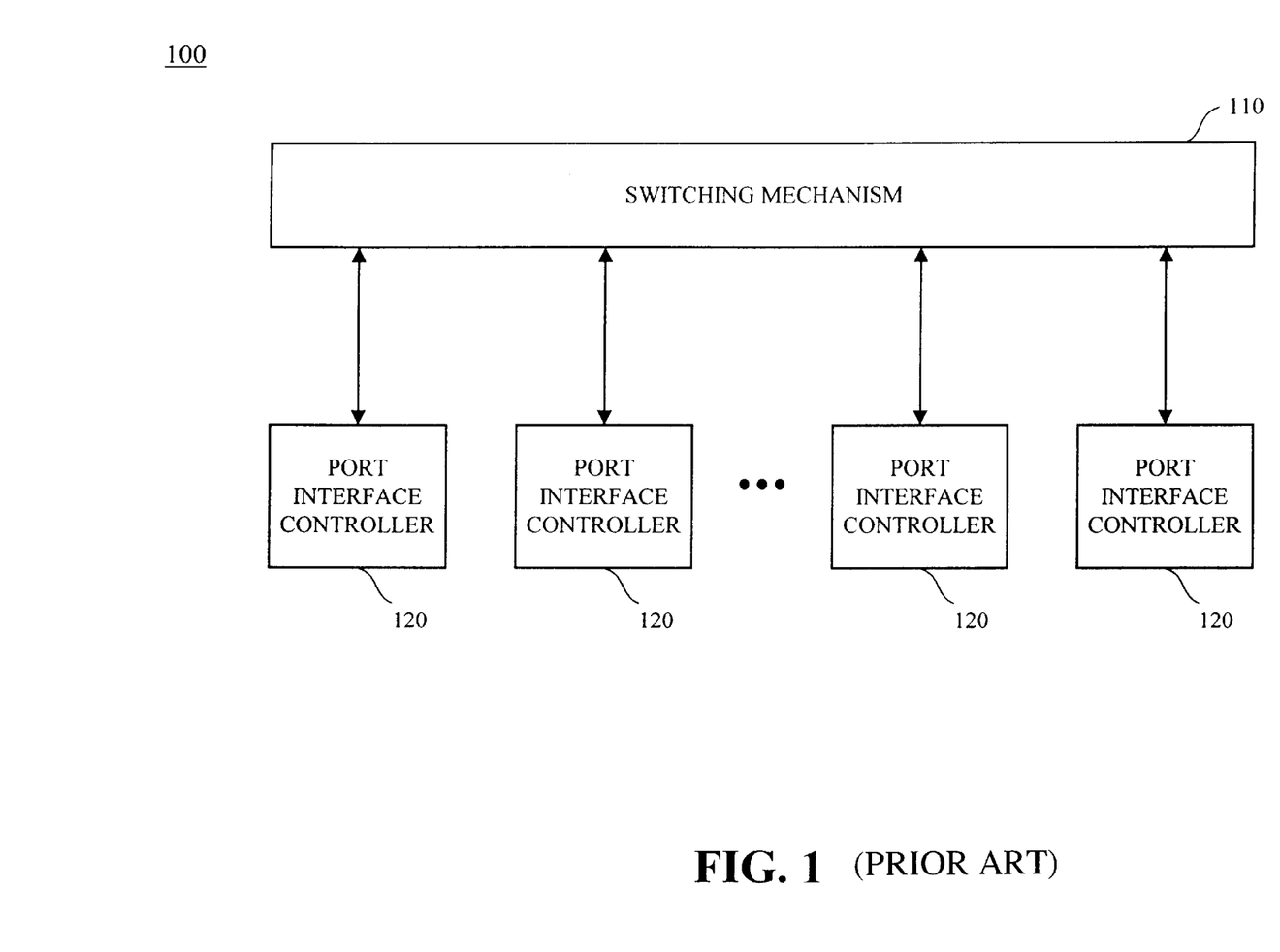
FIG. 1 is a block diagram of an Ethernet switch.

With conventional techniques, a switch transmits multicast packets on all of its ports. FIG. 1 is a block diagram of an Ethernet switch 100. The Ethernet switch 100 includes a switching mechanism 110 connected to several port interface controllers 120. The switching mechanism 110 may include any conventional shared medium, shared memory, or space-division device.

Figure 2:
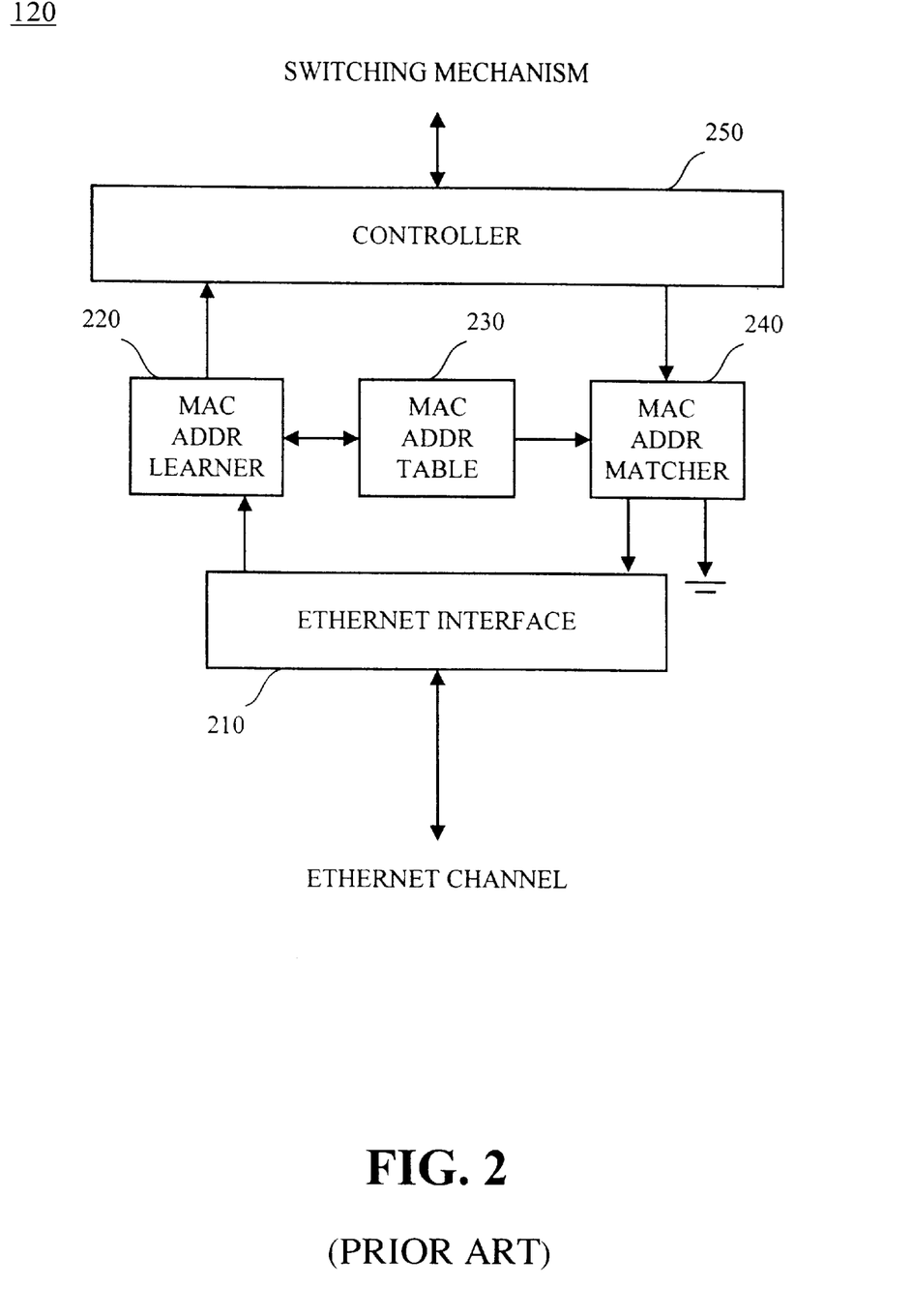
FIG. 2 is a block diagram of a port interface controller in the switch of FIG. 1.

The port interface controller 120 transports packets between a port and the switching mechanism 110. FIG. 2 is a block diagram of a port interface controller 120. The port interface controller 120 includes an Ethernet interface 210, a Media Access Control (MAC) address learner 220, a MAC address table 230, a MAC address matcher 240, and a controller 250.

The Ethernet interface 210 receives an inbound packet transmitted from a host attached to switching mechanism 110 over an Ethernet channel, and passes the packet to the MAC address learner 220. The MAC address learner 220 reads the Ethernet address of the originating host and stores the address in the MAC address table 230, if the address is not already stored there. The controller 250 maintains addresses of attached hosts in the MAC address table 230. If a host has not transmitted for a certain period of time, the controller 250 removes the MAC address of the host from the MAC address table 230.

The MAC address learner 220 sends the received packet to the controller 250, which, in turn, forwards the packet to the switching mechanism 110 (FIG. 1). The switching mechanism 110 identifies the appropriate port interface controller 120 for the packet and sends it to this controller.

The controller 250 of the identified port interface controller 120 receives the packet from the switching mechanism 110 and sends it to the MAC address matcher 240. The MAC address matcher 240 compares the packet's destination address to the MAC addresses stored in the MAC address table 230. If the outbound packet's destination address is of a broadcast or multicast type, or is unicast and matches an entry in the MAC address table 230, the MAC address matcher 240 forwards the packet to its port for transmission to the attached host(s).

Conventional Ethernet switches do not support Internet Protocol (IP) multicasting. IP multicasting first found its application in audio and video conferencing. Each IP multicast group contains a unique class-D IP address ranging from 224.0.0.1 to 239.255.255.255. Multicast data is sent to a group based on this unique address. For an IP multicast packet transmitted on the Ethernet, the multicast Ethernet address includes the least significant 23 bits of the IP address.

Figure 3:
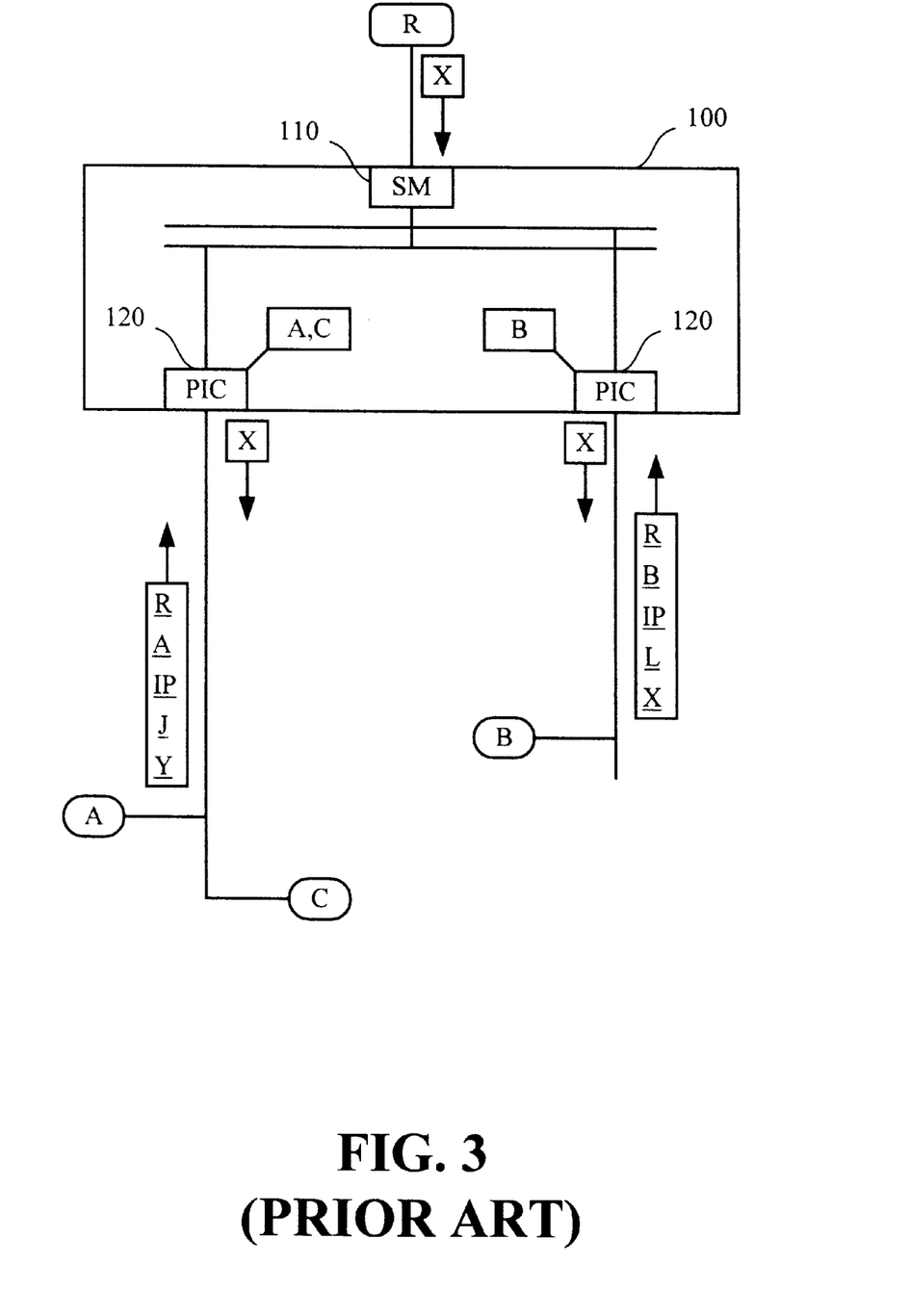
FIG. 3 is a high-level diagram of conventional multicast processing by an Ethernet switch.

FIG. 3 is a high-level diagram of conventional multicast processing by an Ethernet switch. When a host desires to join a particular IP multicast group, the host sends a "request to join" message to the nearest multicast-capable router to request to join the multicast group and receive information sent to this group. In FIG. 3, host A sends a message to join multicast group Y, and host B sends a message to join multicast group X. The router R propagates the request up to the multicast source if the data path is not already in place.

Upon receiving an IP packet for group X, for example, the router R maps the class-D IP multicast group address into an Ethernet multicast address, and sends the resultant Ethernet packet to the appropriate switch(es) 100. The switch 100 transmits the packet on all of its ports.

The current Internet Group Management Protocol (IGMP) does not specify an explicit message for withdrawing membership from the multicast group. A host's membership expires when the router does not receive a periodic membership report from the host.

Some conventional Ethernet switches route IP packets and, therefore, support IP multicasting. However, despite the words "Ethernet switch" in their names, they are, in fact, not Ethernet switches, but routers because the actual switching is carried out at the IP or the network layer, not at the Ethernet or data link layer. Consequently, their performance and cost are comparable with routers and much higher than that of Ethernet switches due to the overhead of IP decoding and routing.

No multicast mechanism currently exists at the data link layer, corresponding to the IP layer. As a result, a conventional Ethernet switch broadcasts multicast packets, sending them to all ports regardless of whether the hosts attached to these ports are intended recipients for the packets. It is the responsibility of the receiving host to determine whether a packet belongs to the groups that have been requested at the IP layer The receiving host makes this determination through the use of an address filter either implemented in hardware on a Local Area Network (LAN) controller or in communication control software.

Thus, the current technologies for switching multicast packets at the data link layer are inefficient and will render the network inoperable when several hosts receive different multicast streams concurrently. To illustrate this problem, suppose that a conventional Ethernet switch includes one network port connecting a multicast router at 100 Mb/s and 24 local ports each connecting to a personal computer (PC) at 10 Mb/s. Assume that each of the PCs is tuned to a different video channel via IP multicasting, and each video stream is coded at 1.5 Mb/s. Since the Ethernet switch sends each multicast packet to all ports, the switch incurs a load of 24×1.5=36 Mb/s at each local port, far exceeding the PCs' 10 Mb/s capacity. As a result, the network becomes bogged down by congestion.

The inefficiencies of conventional Ethernet switches becomes particularly problematic in remote networks, such as the public switched data network. Malfunctioning or malicious equipment attached to a port of a switch can generate broadcast or multicast messages that overload all other ports of the same switch.

Therefore, a need exists to overcome the deficiencies of the conventional data link layer switches.

SUMMARY OF THE INVENTION

Systems and methods consistent with the principles of the present invention address this need by providing true multicasting at an Ethernet switch by treating multicast addresses as unicast addresses. In this way, the need for expensive IP decoding and routing is eliminated.

In accordance with the purpose of the invention as embodied and broadly described herein, a system consistent with the present invention includes a switching mechanism coupled to a plurality of port interface controllers. The port interface controllers include an address table, an address learner, and an address matcher. The address table stores multicast addresses for hosts attached to the port interface controller. The address learner compares a destination address in an incoming packet to a target address, and stores a multicast address from the incoming packet in the address table when the destination address matches the target address. The address matcher compares a destination address in an outgoing packet to the multicast addresses stored in the address table, and transmits the outgoing packet when the destination address matches one of the multicast addresses.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention support true multicasting in a data link layer switch, such as an Ethernet switch, by treating multicast addresses the same as unicast addresses to transmit packets on only those ports with hosts that have previously joined the multicast group. This Ethernet switch multicasting reduces network traffic load and allows the Ethernet switch to be used for a large number of multicast streams. In particular, this switch can be used to provide near video-on-demand and broadcast video services.

Referring to FIG. 1, an Ethernet switch consistent with the present invention contains a standard configuration. That is, the Ethernet switch includes a switching mechanism 110 coupled to several port interface controllers 120. The port interface controllers 120 contain the standard elements shown in FIG. 2. The operation of the port interface controllers 120 differ, however, from the standard multicast processing described with regard to FIG. 3.

Figure 4:
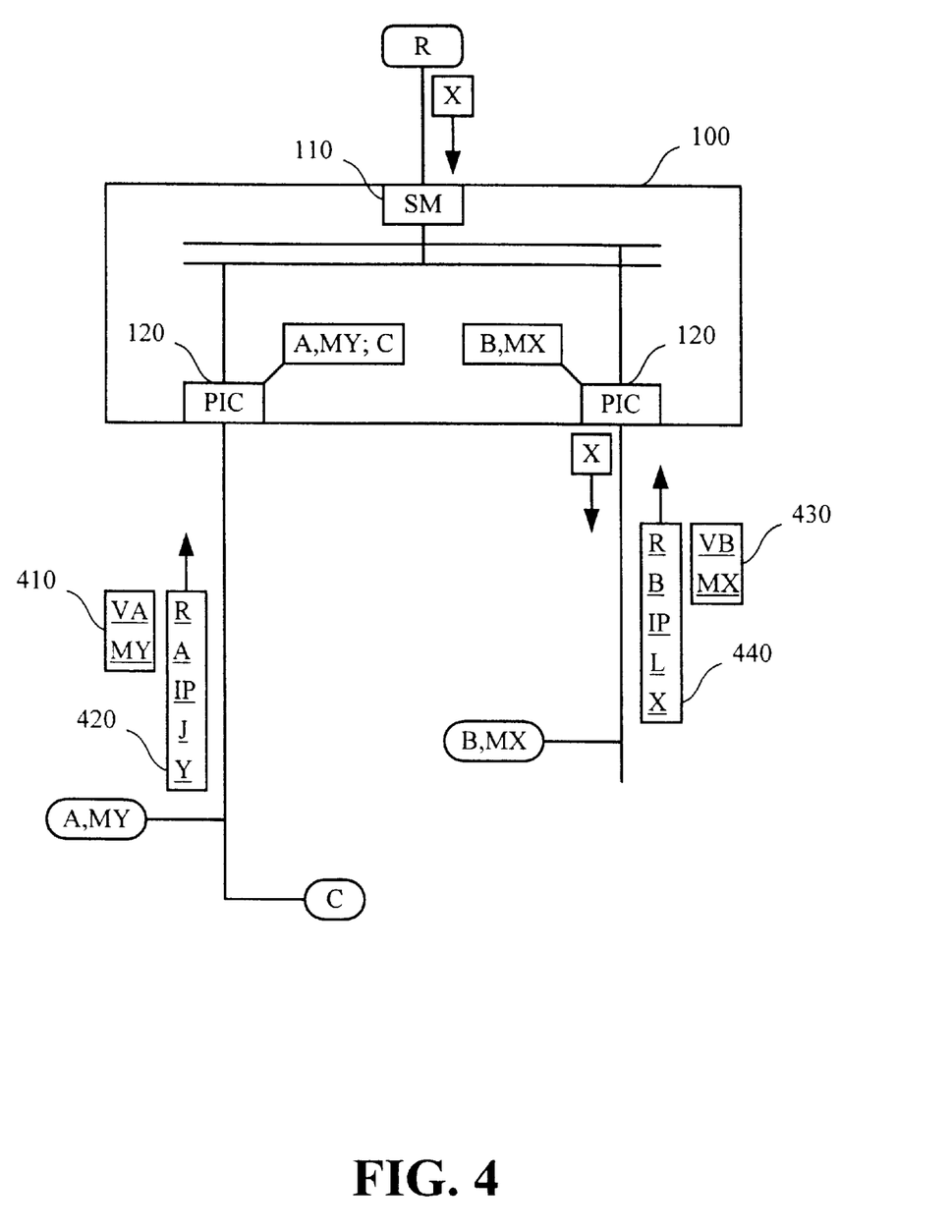
FIG. 4 is a high-level diagram of multicast processing by an Ethernet switch consistent with the present invention.

FIG. 4 is a high-level diagram of multicast processing by an Ethernet switch consistent with the present invention. The data link layer protocol uses two virtual MAC addresses of the unicast type to represent requests for joining and leaving a multicast group. In the example shown in FIG. 4, the virtual MAC address VA indicates a request to join a multicast group and the virtual MAC address VB indicates a request to leave a multicast group. No packets, other than packets requesting to join or leave a multicast group, contain the virtual addresses VA or VB as their destination address.

EXEMPLARY PROCESSING FOR JOINING A MULTICAST GROUP

Figure 5A:
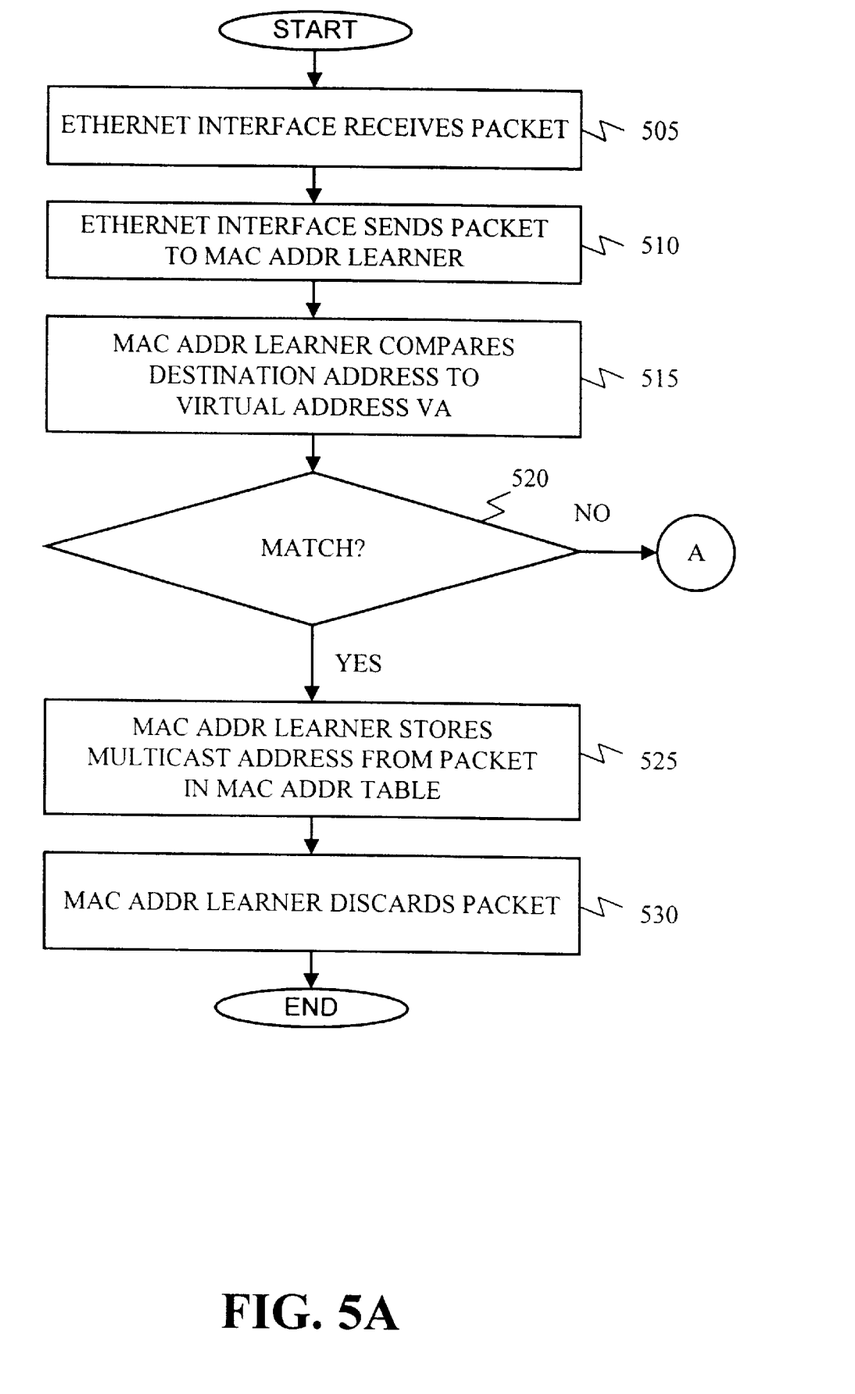
FIGS. 5A and 5B are flowcharts of processing for joining a multicast group in a manner consistent with the present invention.
Figure 5B:
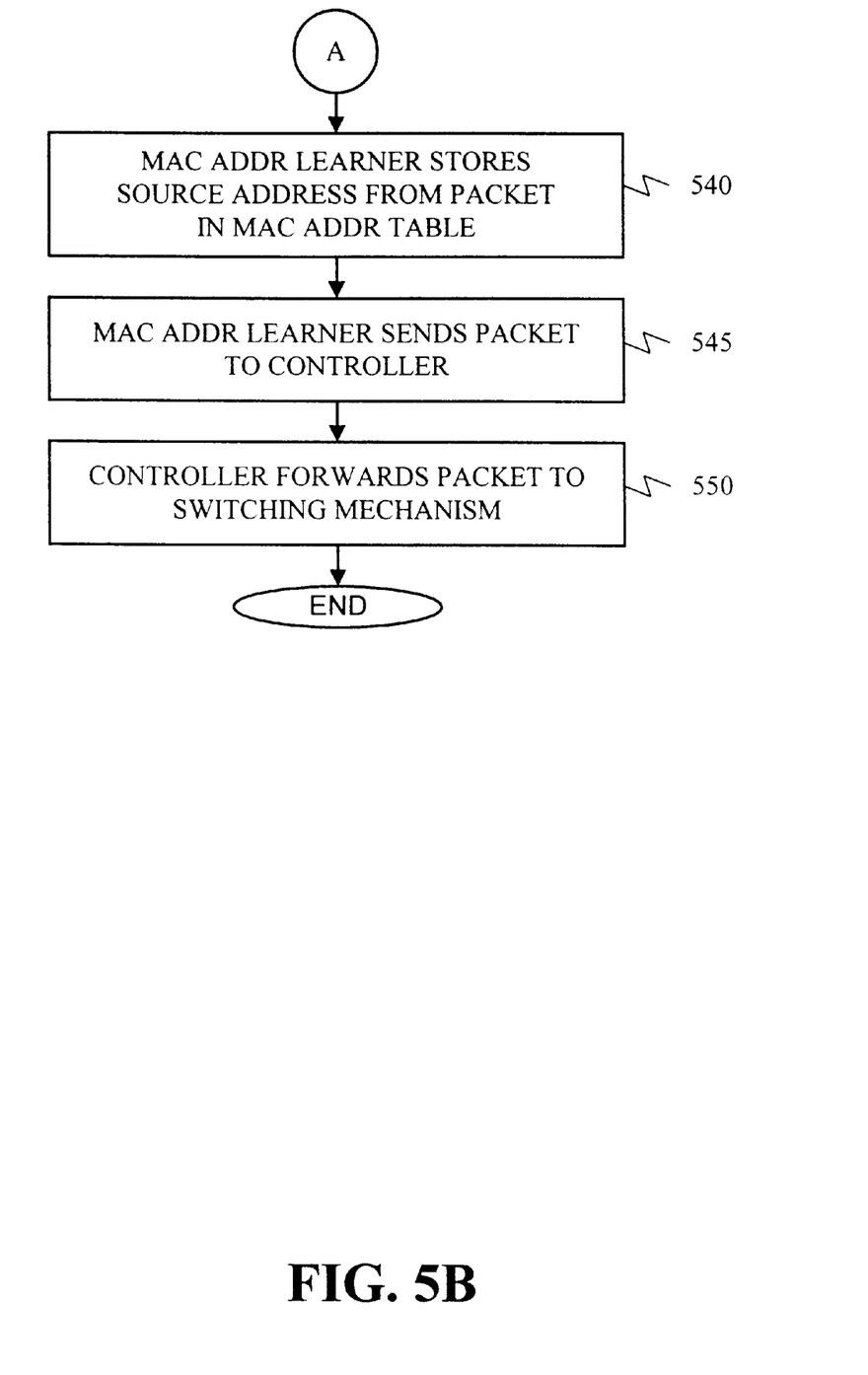

FIGS. 5A and 5B are flowcharts of processing for joining a multicast group in a manner consistent with the present invention. A host sends a packet to the virtual address VA with a multicast address as the source address and an empty data set to indicate a request for joining a multicast group at the data link layer. The host sends the packet either immediately before or immediately after the host transmits an IGMP message for joining a multicast group. In the example diagram of FIG. 4, host A sends a packet 410 to virtual address VA along with an IGMP message 420 to request joining the multicast group MY.

The Ethernet interface 210 (FIG. 2) in the port interface controller 120 receives the packet from the host [step 505], and sends the packet to the MAC address learner 220 [step 510]. The MAC address learner 220 compares the destination address in the packet to the virtual address VA [step 515]. If the destination address matches the virtual address VA [step 520], the learner 220 reads the source multicast address from the packet and stores it in the MAC address table 230 [step 525]. The multicast address appears to the MAC address learner 220 not as a multicast address, but as an address from a new host. Once the learner 220 stores the address, it discards the packet [step 530].

When the destination address in the packet does not match the virtual address VA [step 520], the MAC address learner 220 knows that the packet is not a request to join a multicast group. In this case, the learner 220 reads the source MAC address from the packet and stores it in the MAC address table 230 [step 540] (FIG. 5B). The learner 220 then sends the packet to the controller 250 [step 545]. The controller 250 forwards the packet to the switching mechanism for routing to the appropriate destination [step 550].

To appropriately handle multicast addresses, the switch 100 allows for multiple appearances of the same MAC address on different ports. The switch 100 preferably permits only multicast addresses to appear on multiple ports so that the switch can differentiate multicast addressing from instances where a host moves from one port to another.

EXEMPLARY PROCESSING FOR TRANSMITTING MULTICAST PACKETS

Figure 6:
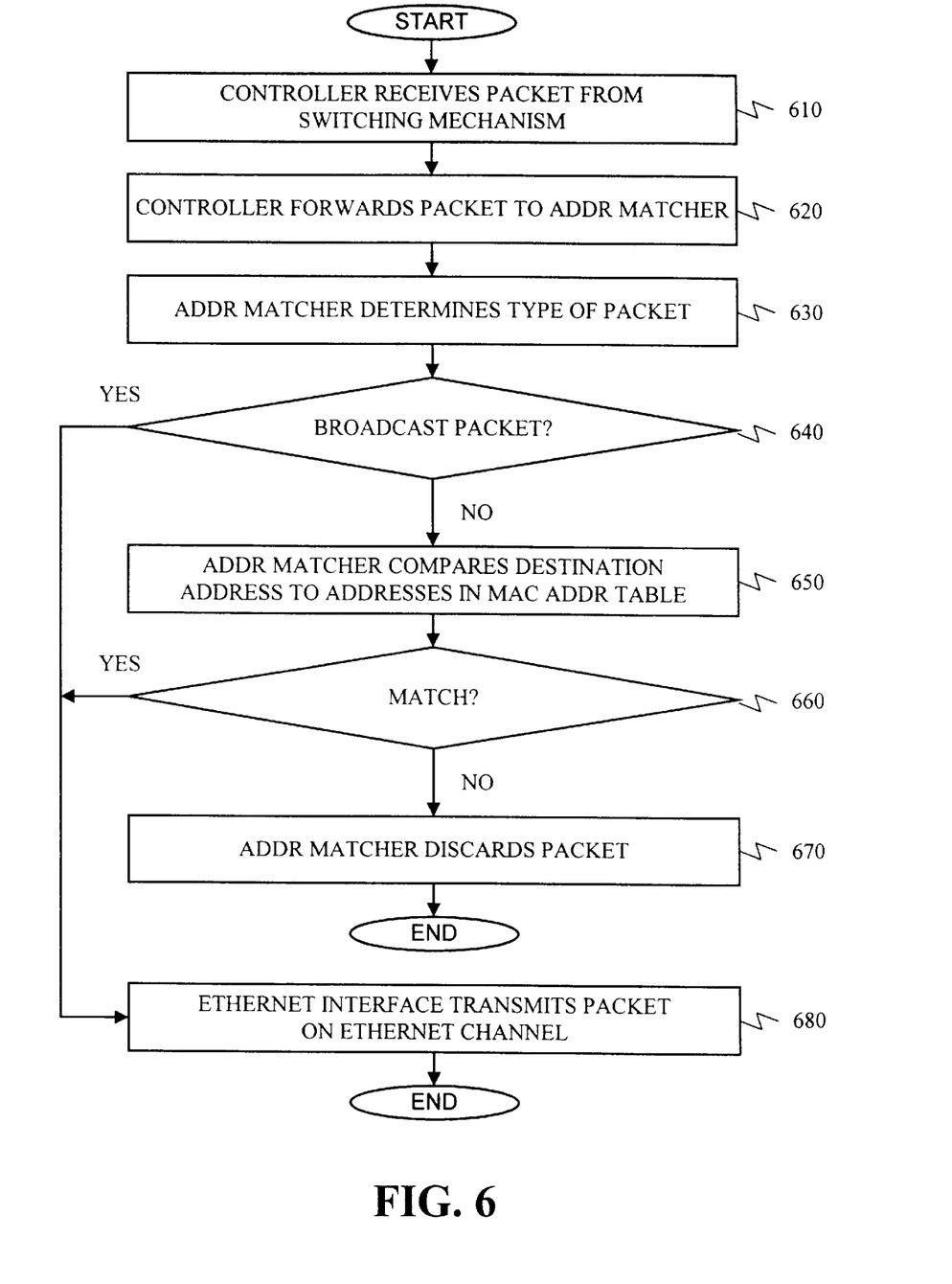
FIG. 6 is a flowchart of processing for transmitting multicast packets in a manner consistent with the present invention.

FIG. 6 is a flowchart of processing for transmitting multicast packets in a manner consistent with the present invention. The controller 250 receives an outgoing packet from the switching mechanism [step 610]. The controller 250 forwards the packet to the address matcher 240 [step 620].

The address matcher 240 determines whether the packet is of a unicast or broadcast type, making no distinction for multicast packets [step 630]. If the packet is not a broadcast packet [step 640], the address matcher 240 compares the destination address to the addresses stored in the MAC address table 230 [step 650]. If the destination does not match an address in the table [step 660], the matcher 240 discards the packet [step 670].

If the packet is a broadcast packet [step 640] or is a unicast packet and the destination address matches an address in the MAC address table 230 [step 660], the address matcher 240 transmits the packet on the Ethernet channel via the Ethernet interface 210 [step 680]. The transmission ends the processing of the outgoing packet by the port interface controller 120.

EXEMPLARY PROCESSING FOR LEAVING A MULTICAST GROUP

The port interface controller 120 maintains local multicast addresses in its MAC address table 230 through either a "soft-state" or "hard-state" mode. These modes differ by the way the multicast addresses are removed from the MAC address table 230. The soft-state mode uses a timer to remove an address automatically. Whereas, in the hard-state mode, address removal requires an explicit action.

In the soft-state mode operation, the MAC address table 230 stores an address for only a set period of time. The controller 250 removes the address when it has not been refreshed or active before the time period expires. The hard-state mode operation, on the other hand, relies on the host to send an explicit message to remove the address. Both modes has its advantages: the soft-state mode is more reliable and robust in the event of a host crashing, and the hard-state mode minimizes control traffic overhead.

Figure 7:
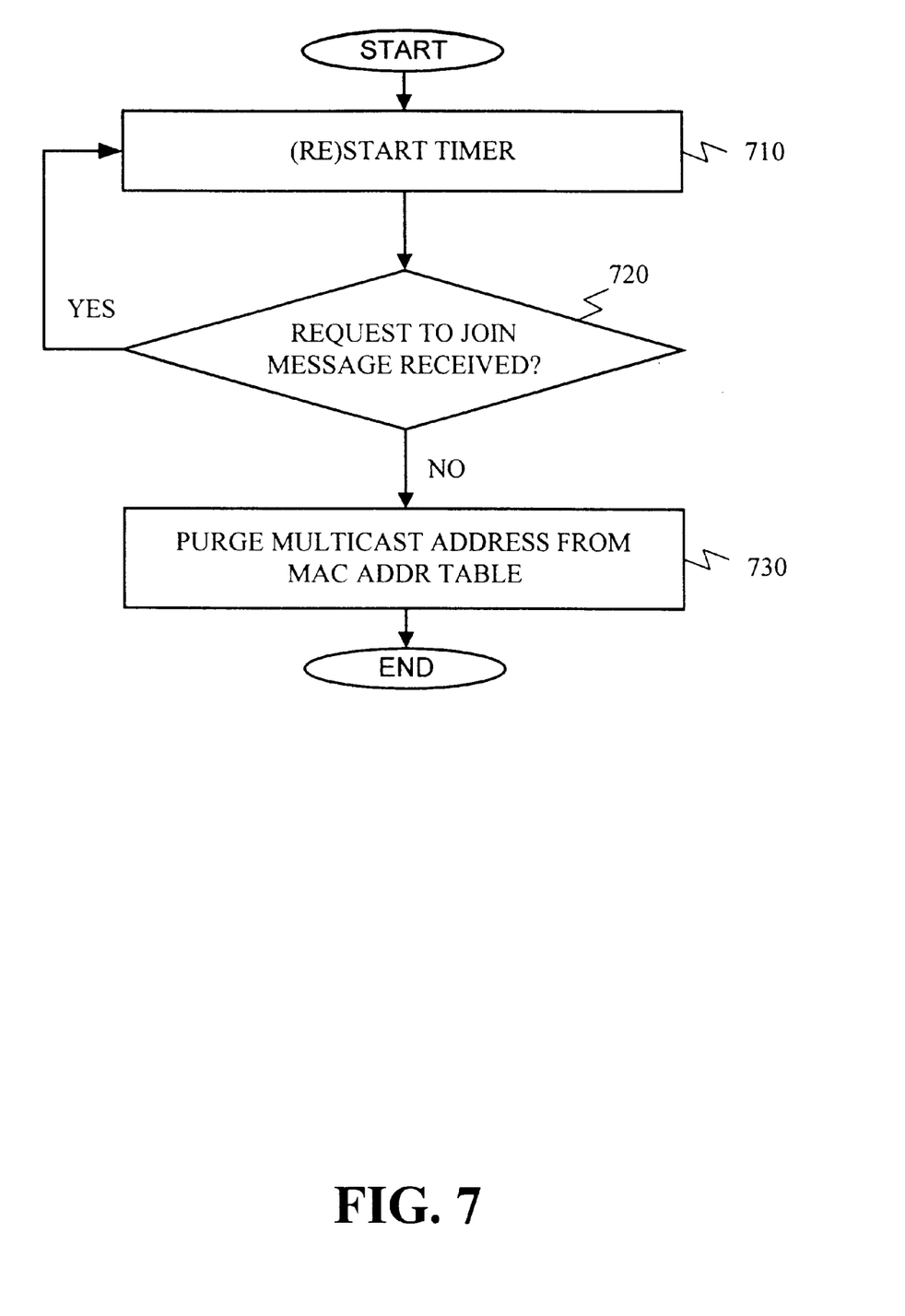
FIG. 7 is a flowchart of processing for leaving a multicast group in a soft-state mode consistent with the present invention.

FIG. 7 is a flowchart of processing for leaving a multicast group in a soft-state mode consistent with the present invention. The controller 250 contains a timer for determining the amount of time that an address remains in the MAC address table 230. The timer may be implemented in hardware, via a conventional counting device, or in software, via a conventional counting algorithm. The timer period is configurable, but should be set to a value no smaller than the IGMP message interval.

When a multicast address is stored in the MAC address table 230, the controller 250 starts a timer [step 710]. If a request to join message is received from a host before the timer expires [step 720], the controller restarts the timer [step 710]. If no request to join message is received before the timer expires [step 720], however, the controller 250 removes the multicast address from the MAC address table 230 [step 730].

Figure 8:
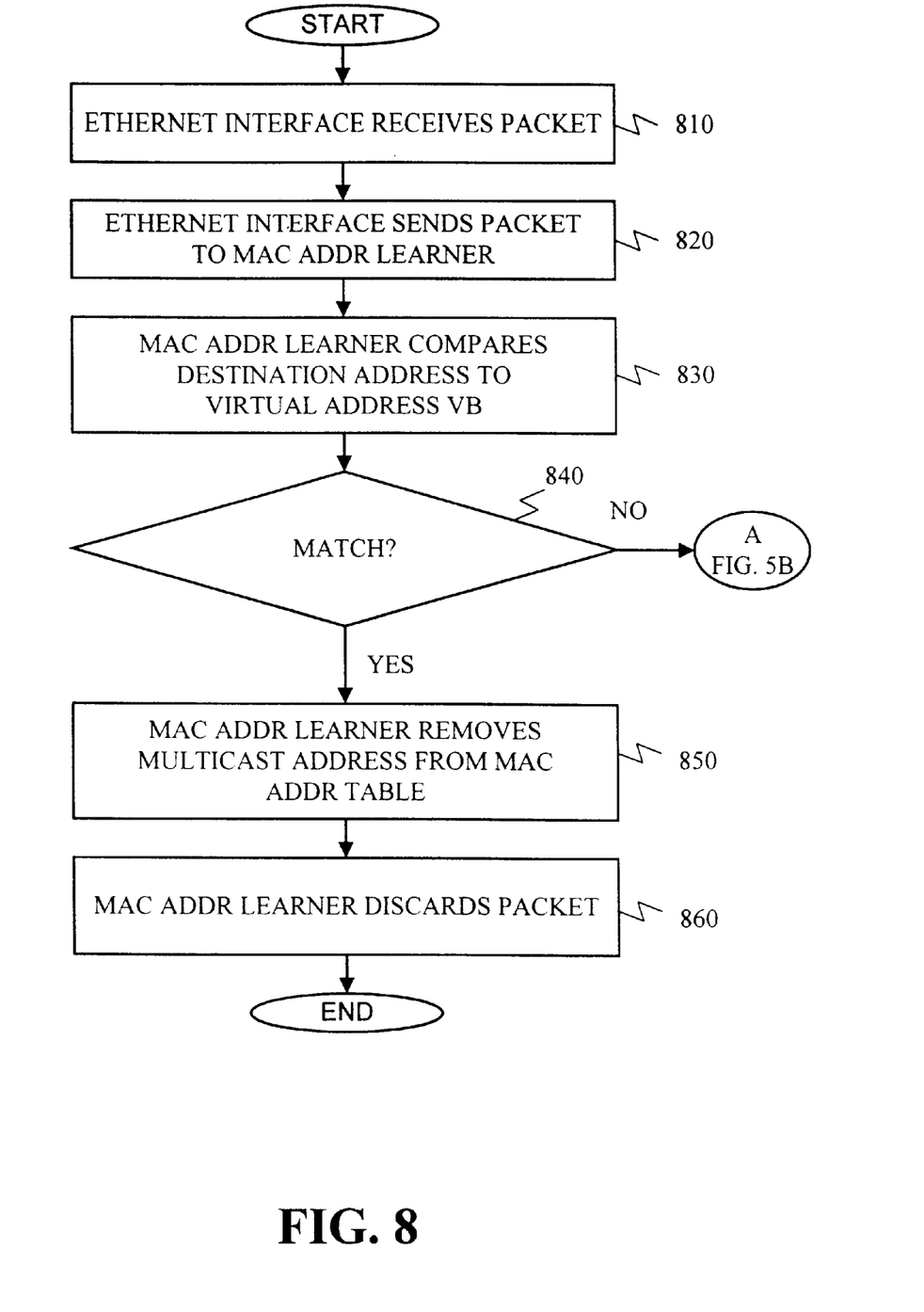
FIG. 8 is a flowchart of processing for leaving a multicast group in a hard-state mode consistent with the present invention.

FIG. 8 is a flowchart of processing for leaving a multicast group in a hard-state mode consistent with the present invention. A host sends a packet to the virtual address VB with a multicast address as the source address and an empty data set to indicate a request for leaving a multicast group at the data link layer. The host sends the packet either immediately before or immediately after the host transmits an IGMP message for leaving a multicast group. In the example diagram of FIG. 4, host B sends a packet 430 to virtual address VB along with an IGMP message 440 to request leaving the multicast group MX.

The Ethernet interface 210 (FIG. 2) in the port interface controller 120 receives the packet from the host [step 810], and sends the packet to the MAC address learner 220 [step 820]. The MAC address learner 220 compares the destination address in the packet to the virtual address VB [step 830]. If the destination address matches the virtual address VB [step 840], the learner 220 reads the source multicast address from the packet and removes it from the MAC address table 230 [step 850]. The learner 220 then discards the packet [step 860)].

When the destination address in the packet does not match the virtual address VB [step 840], the MAC address learner knows that the packet is not a request to leave a multicast group. In this case, the learner 220 reads the source MAC address from the packet and stores it in the MAC address table 230 [step 540] (FIG. 5B). The learner 220 then sends the packet to the controller 250 [step 545]. The controller 250 forwards the packet to the switching mechanism for routing to the appropriate destination [step 550].

LIMITED BROADCAST STORM

A switch 100 consistent with the present invention provides a limited broadcast technique. The switch 100 designates one port as a network port and the other ports as local ports. The network port connects to a router, for example. The local ports connect to the hosts.

The switch 100 sends broadcast packets from the network port to all of the local ports, but transmits broadcast packets from the local ports to only the network port. In this way, the packet flow from the network to individual ports is unaffected by broadcast packets from the local ports. As a result, network management entities at the switch 100, or attached to the network port, can detect any suspicious broadcast storm and take corrective action.

The systems and methods consistent with the present invention support multicasting in a data link layer switch by treating multicast packets as unicast packets to send packets to only those ports having an attached host that has joined the multicast group.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the foregoing description was directed toward multicasting in an Ethernet switch. However, the present invention is not limited to an Ethernet switch. The foregoing description applies equally well to other data link layer switching mechanisms.

Also, the processing for joining and leaving a multicast group have been described as separate operations, but this is not the case. The MAC address learner, for example, determines whether an incoming packet is a request to join packet, a request to leave packet, or an ordinary packet, and performs the necessary processing.

What is claimed is:

1. In a data link layer switch having a switching mechanism coupled to a plurality of port interface controllers, each of the port interface controllers comprising:

an address table that stores multicast addresses for hosts attached to the port interface controller;

an address learner that compares a destination address in an incoming packet to predetermined address, and stores a multicast address from the incoming packet in the address table if the destination address matches the predetermined address; and an address matcher that compares a destination address in an outgoing packet to the multicast addresses stored in the address table, and transmits the outgoing packet when the destination address matches one of the multicast addresses.

2. The port interface controller of claim 1, wherein the address learner includes means for comparing the destination address in the incoming packet to a second predetermined address, and means for removing the multicast address from the address table if the destination address matches the second predetermined address.

3. The port interface controller of claim 2, wherein the address learner further includes means for discarding the incoming packet after removing the multicast address from the address table.

4. The port interface controller of claim 1, wherein the address learner includes means for discarding the incoming packet after storing the multicast address in the address table.

5. The port interface controller of claim 1, wherein the address matcher includes means for discarding the outgoing packet if the destination address fails to match one of the multicast addresses in the address table.

6. The port interface controller of claim 1, wherein the address matcher includes means for determining whether the outgoing packet is one of a broadcast packet and a unicast packet, and means for comparing the destination address in the outgoing packet to the multicast addresses stored in the address table only when the outgoing packet is determined to be a unicast packet.

7. In a data link layer switch having a switching mechanism coupled to a plurality of port interface controllers, each of the port interface controllers including an address table connected to an address learner, a method for processing an incoming packet by the address learner, the method comprising the steps of:

comparing a destination address in the incoming packet to a predetermined address; and storing a multicast address from the incoming packet in the address table when the destination address matches the predetermined address.

8. The method of claim 7, further comprising the steps of:

comparing the destination address in the incoming packet to a second predetermined address; and removing the multicast address from the address table when the destination address matches the second predetermined address.

9. The method of claim 8, wherein the removing step includes the substep of:

discarding the incoming packet after removing the multicast address from the address table.

10. The method of claim 7, wherein the storing step includes the substep of:

discarding the incoming packet after storing the multicast address in the address table.

11. In a data link layer switch having a switching mechanism coupled to a plurality of port interface controllers, each of the port interface controllers comprising:

an address table that stores multicast addresses for hosts attached to the port interface controller;

an address learner that compares a destination address in an incoming packet to predetermined address, and removes a multicast address in the incoming packet from the address table if the destination address matches the predetermined address; and an address matcher that compares a destination address in an outgoing packet to the multicast addresses stored in the address table, and transmits the outgoing packet when the destination address matches one of the multicast addresses.

12. The port interface controller of claim 11, wherein the address learner includes means for comparing the destination address in the incoming packet to a second predetermined address, and means for storing the multicast address in the address table if the destination address matches the second predetermined address.

13. The port interface controller of claim 12, wherein the address learner further includes means for discarding the incoming packet after storing the multicast address in the address table.

14. The port interface controller of claim 11, wherein the address learner includes means for discarding the incoming packet after removing the multicast address from the address table.

15. The port interface controller of claim 11, wherein the address matcher includes means for discarding the outgoing packet if the destination address fails to match one of the multicast addresses in the address table.

16. The port interface controller of claim 11, wherein the address matcher includes means for determining whether the outgoing packet is one of a broadcast packet and a unicast packet, and means for comparing the destination address in the outgoing packet to the multicast addresses stored in the address table only when the outgoing packet is determined to be a unicast packet.

17. In a data link layer switch having a switching mechanism coupled to a plurality of port interface controllers, each of the port interface controllers including an address table storing multicast addresses connected to an address learner, a method for processing an incoming packet by the address learner, the method comprising the steps of:

comparing a destination address in the incoming packet to a predetermined address; and removing a multicast address in the incoming packet from the address table when the destination address matches the predetermined address.

18. The method of claim 17, further comprising the steps of:

comparing the destination address in the incoming packet to a second predetermined address; and storing the multicast address in the address table when the destination address matches the second predetermined address.

19. The method of claim 18, wherein the storing step includes the substep of:

discarding the incoming packet after storing the multicast address in the address table.

20. The method of claim 17, wherein the removing step includes the substep of:

discarding the incoming packet after removing the multicast address from the address table.

21. A data link layer switch, comprising:

a switching mechanism; and a plurality of port interface controllers coupled to the switching mechanism, each of the port interface controllers including an address table that stores multicast addresses for hosts attached to the port interface controller, an address learner that compares a destination address in an incoming packet to first and second predetermined addresses, stores a multicast address from the incoming packet in the address table if the destination address matches the first predetermined address, and removes the multicast address from the address table if the destination address matches the second predetermined address, and an address matcher that compares a destination address in an outgoing packet to the multicast addresses stored in the address table, and transmits the outgoing packet when the destination address matches one of the multicast addresses.

22. A data link layer switch, comprising:

means for storing multicast addresses for hosts attached to the switch;

means for receiving incoming and outgoing packets at the switch;

means for comparing a destination address in one of the incoming packets to first and second predetermined addresses;

means for writing a multicast address from the incoming packet in the storing means when the destination address matches the first predetermined address;

means for removing the multicast address from the storing means when the destination address matches the second predetermined address;

means for comparing a destination address in one of the outgoing packets to the multicast addresses in the storing means; and means for transmitting the outgoing packet if the destination address matches one of the multicast addresses.

23. A method for processing incoming and outgoing packets in a data link layer switch, comprising the steps of:

storing multicast addresses for hosts attached to the switch in an address table;

comparing a destination address in one of the incoming packets to first and second predetermined addresses;

writing a multicast address from the incoming packet in the address table when the destination address matches the first predetermined address;

removing the multicast address from the address table when the destination address matches the second predetermined address;

comparing a destination address in one of the outgoing packets to the multicast addresses in the address table; and transmitting the outgoing packet if the destination address matches one of the multicast addresses.

* * * * *